United States Patent [19]

Ellis

[11] Patent Number: 4,836,258
[45] Date of Patent: Jun. 6, 1989

[54] ATTACHMENT APPARATUS FOR A TIRE MAT

[76] Inventor: Reginald C. L. Ellis, 4 Holly Hill Road, Forest Vale Industrial Estate, Cinderford, Gloucestershire, England

[21] Appl. No.: 215,586

[22] Filed: Jul. 5, 1988

[30] Foreign Application Priority Data

Jul. 10, 1987 [GB] United Kingdom ............... 8716272

[51] Int. Cl.[4] ............................................. B60C 27/10
[52] U.S. Cl. ............................ 152/213 A; 152/208; 152/217; 152/218
[58] Field of Search .................... 152/171, 172, 213 A, 152/217, 218, 219, 221, 225 R, 241, 242; 24/68 CT, 69 TT

[56] References Cited

U.S. PATENT DOCUMENTS

| | | | |
|---|---|---|---|
| 1,244,018 | 10/1917 | Beranek | 152/218 |
| 2,540,230 | 2/1951 | Andrews | 152/219 |
| 2,646,099 | 7/1953 | Johnson | 152/242 |
| 4,098,314 | 7/1978 | Welsh | 152/216 |

Primary Examiner—Michael W. Ball
Assistant Examiner—Gregory J. Wilber
Attorney, Agent, or Firm—Young & Thompson

[57] ABSTRACT

In order to attach a tire mat to the circumference of a tired wheel, a front flexible elongate member is slidingly passed through attachment fittings on the mat spaced around the periphery of the front side of the wheel, and a rear flexible elongate member is slidingly passed through attachment fittings on the mat spaced around the periphery of the rear side of the wheel. Respective sliding attachment members are then used to attach parts of each elongate member together so as to enable relative sliding movement between the parts and so as to cause the elongate member to form an intermediate loop portion which extends through the attachment fittings on the associated side of the wheel and a further portion outside the loop portion. The further portion of the rear elongate member is passed across the circumference of the wheel to the front side of the wheel by way of a guide piece, and finally a tensioning device is connected at the front side of the wheel to the further portions of both elongate members and operated so as to tension the loop portions of both elongate members to draw the attachment fittings radially inwardly of the wheel and to thereby secure the mat firmly on the circumference of the wheel.

10 Claims, 3 Drawing Sheets

1

ATTACHMENT APPARATUS FOR A TIRE MAT

BACKGROUND OF THE INVENTION

This invention relates to attachment apparatus for attaching a tire mat to the circumference of a tired wheel. It will be understood that a tire mat is a mat for attachment to the circumference of a tired wheel in order to increase the grip of the wheel relative to the ground in conditions of snow, ice or mud or in other conditions in which normal tires do not provide enough grip to transmit sufficient traction forces to enable the vehicle to be driven.

In British Patent Specification No. 2,135,252 there is described a tire mat of the kind comprising a flexible mat having a plurality of resilient gripping members formed integrally with the mat on one surface of the mat. The mat is secured around the outside of the tired wheel so that these gripping members extend outwardly. There are also resilient projections formed integrally with the mat on the other surface of the mat, which, in use, engage in grooves formed by the treads of the tire. Each of the gripping members on one side of the mat has one of the projections aligned opposite thereto on the other side of the mat. The tire mat described is particularly efficient in the transmission of traction forces in conditions including snow, ice and mud, and is also usable at moderate speeds on metalled roads without damage to the tire or to the road surface. However, the efficiency of the mat is dependent upon secure fastening to the wheel.

There are many tire mat designs in existence, though few approach the effectiveness of the mat just described, and many systems and apparatus have been proposed for attaching and securing the mats in place on a wheel. In some instances chains or wires are used to secure mats, and, although these are strong, they often do not reliably remain tight, thus allowing the mat to slip out of position, and are often complex to mount and remove. Other attachment systems are relatively weak, and are prone to breakage. In many cases, the procedures for fitting tire mats are complicated, and some require skill or strength. Also, some require access to the inside of the wheel, which is often dirty and wet, when the mat is to be fitted. Some include fastenings which must be secured on the inside of the wheel in positions which cannot be seen, and which therefore have to be manipulated by feel.

It is the object of this invention to provide attachment apparatus for a tire mat which is reliable, strong and secure in use, and which can be simply fitted without risk of undue soiling of clothes or hands.

SUMMARY OF THE INVENTION

In accordance with the present invention there is provided attachment apparatus for attaching a tire mat to the circumference of a tired wheel, the apparatus comprising a front flexible elongate member for slidingly extending through attachment fittings on the mat spaced around the periphery of the front side of the wheel when the mat is attached to the wheel, and a rear flexible elongate member for slidingly extending through attachment fittings on the mat spaced around the periphery of the rear side of the wheel when the mat is attached to the wheel, characterised in that the apparatus further comprises respective sliding attachment means on each of the elongate members for attaching parts of the associated elongate member together so as to enable relative sliding movement between said parts and so as to cause said elongate member to form an intermediate loop portion which extends through the attachment fittings on the associated side of the wheel and a further portion outside said loop portion, guide means for guiding the further portion of the rear elongate member across the circumference of the wheel to the front side of the wheel, and tensioning means for connection at the front side of the wheel to the further portions of both elongate members and operable to tension the loop portions of both elongate members so as to draw the attachment fittings radially inwardly of the wheel and to thereby secure the mat firmly on the wheel.

The use of such attachment apparatus enables the mat to be easily fitted to the wheel without the necessity for making complex connections or movements on the side of the wheel which is innermost. Furthermore no great strength is generally required to fit and tension the apparatus, and therefore to secure the mat in place on the wheel.

BRIEF DESCRIPTION OF THE DRAWINGS

In order that the invention may be more fully understood, the invention will now be described, by way of example, with reference to the accompanying drawings, in which.

DETAILED DESCRIPTION OF THE DRAWINGS

Figure 1:
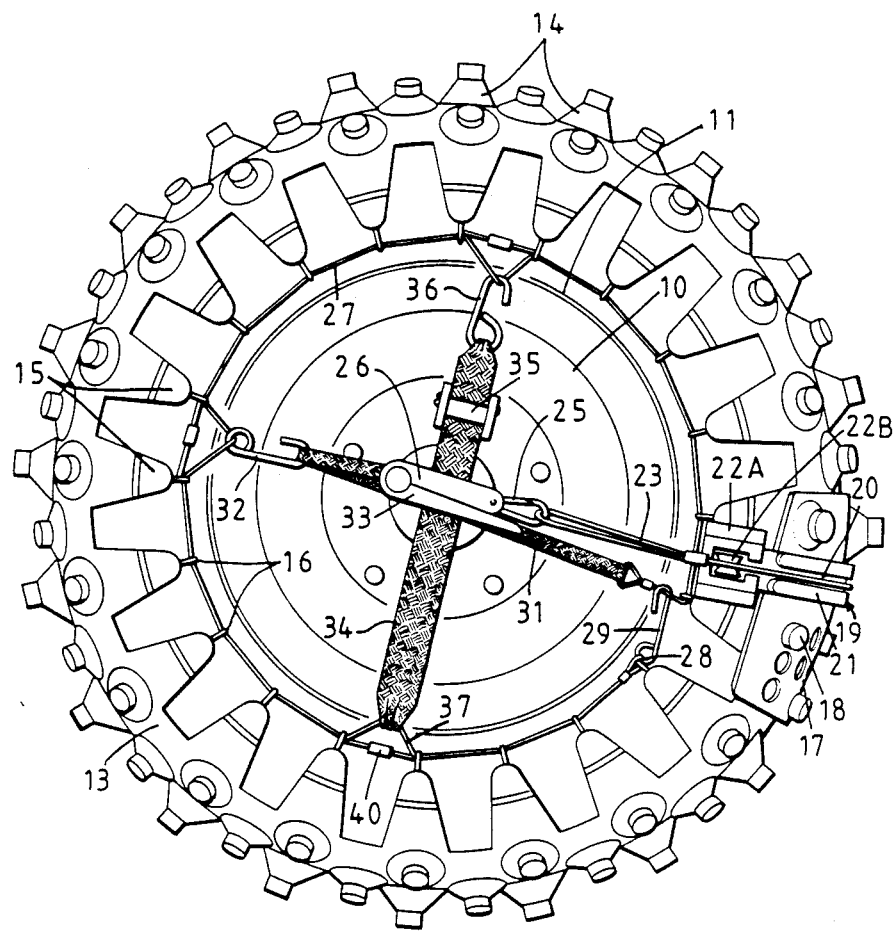
FIG. 1 is a front or outside view, of a vehicle wheel having a tire mat attached thereto by apparatus in accordance with the invention.
Figure 2:
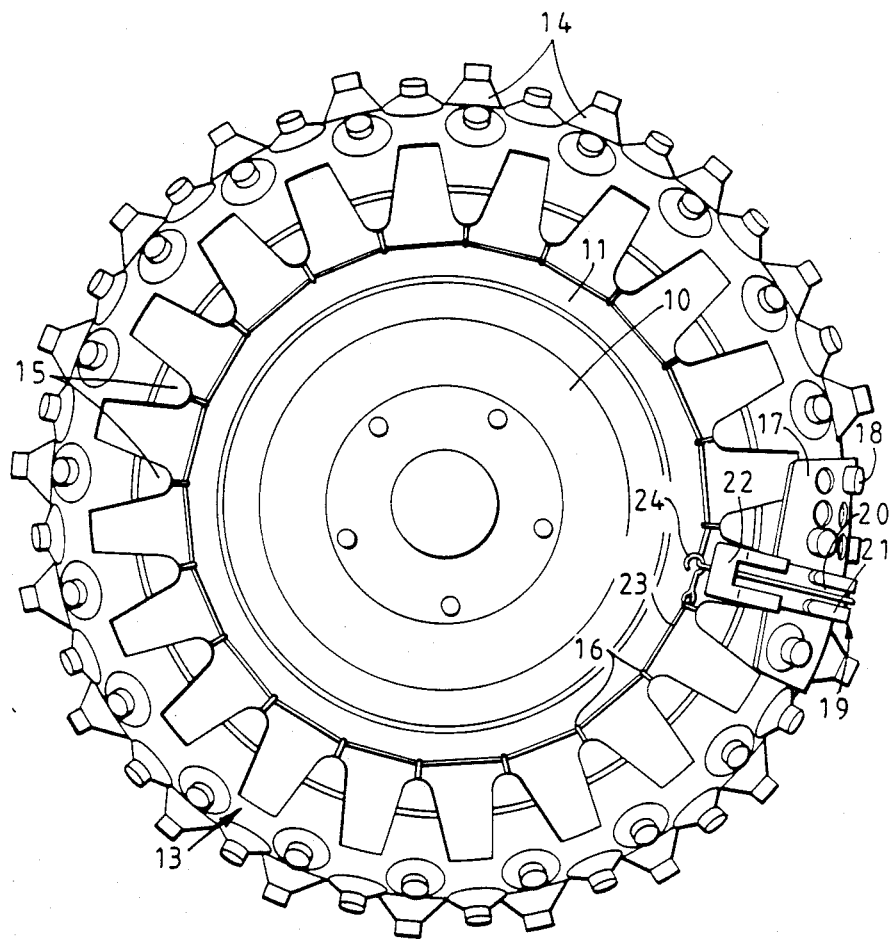
FIG. 2 is a rear or inside view of the vehicle wheel having the tire mat attached thereto.
Figure 3:
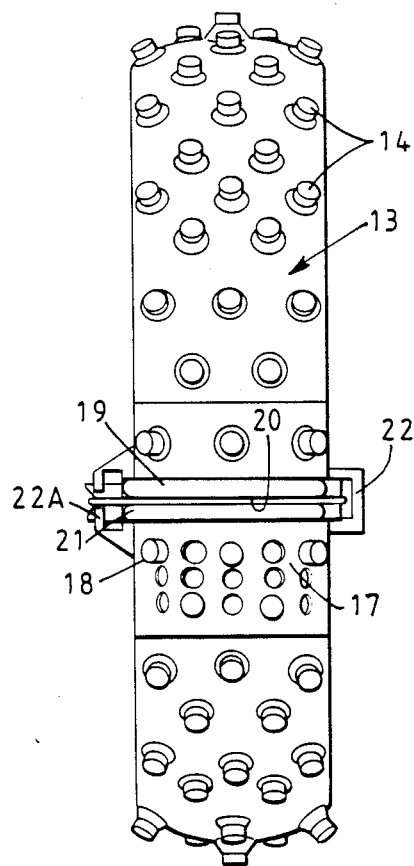
FIG. 3 is a side view of the vehicle wheel.
Figure 4:
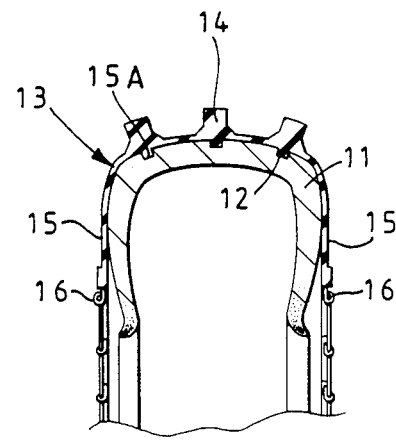
FIG. 4 is a cross-section through part of the vehicle with the tire mat fitted thereto.

FIGS. 1 and 2 show the front and rear of a vehicle wheel 10 which includes a conventional tire 11 having external treads as indicated in the cross-section of the tire 11 shown in FIG. 4.

A tire mat 13, which in this example is of the kind described in British Patent Specification No. 2,135,252, is mounted on the wheel 10. The mat 13 is in the form of a resilient strip having integrally formed resilient gripping members constituted by moulded studs 14 projecting from the outwardly facing surface of the mat 13 and integrally formed projections 15A (see FIG. 4) projecting from the inwardly facing surface of the mat 13.

The projections 15A are aligned opposite to the studs 14 on the other side of the mat 13 and engage in grooves formed by the treads 12 of the tire 11. Each of the studs 14 has a conical base and a cylindrical outer end portion.

The mat 13 is of a length to encircle the whole of the exterior of the tired wheel 10. In the illustrated example the mat 13 is in one piece, but the mat may be made in two pieces joined permanently together by means of a joining strip, or other member, secured by thermal welding or by fasteners. The mat 13 is flexible, and is preferably made from rubber or rubber-like material. Along each longitudinal side of the mat 13 there are integral lugs 15 with reinforced ends, and in each such reinforced end there is secured a ring 16 formed from wire. As seen in FIGS. 1 and 2, the lugs 15 lie against the sides of the tire 11 so that the rings 16 are directed inwardly, and are equally spaced. The lugs 15 are tapered towards their reinforced ends in which the rings 16 are secured.

A generally rectangular joining flap 17 is provided to join the two ends of the mat 13. One end of the joining flap 17 is joined to one end of the mat 13, as by thermal welding or suitable fasteners, and incorporates studs 14 identical to those provided on the mat 13. The other end of the joining flap 17 has a pattern of holes 18 each of which is of a size to engage over the cylindrical outer portion of one of the studs 14. The holes 18 in the joining flap 17 can therefore be engaged over appropriate studs 14 at the other end of the mat 13, depending upon the length of the circumference of the tire, so that the mat 13 extends relatively tightly over the exterior of the tire 11.

A bridge piece 19, which is also made of rubber or rubber-like material, extends across the joining flap 17. The bridge piece 19 is a strip having two spaced parallel ribs 21 and a channel 20 therebetween. These ribs 21 project outwardly from the bridge piece 19, and therefore from the tire 11, when the mat is fitted in position. The bridge piece 19 overlies a portion of the joining flap 17 which is without studs 14 extending through the joining flap 17. At one end the bridge piece 19 has an integral rectangular sleeve portion 22 which, in use, extends to the rear of the tire 11, as seen particularly in FIG. 2. At the other end the bridge piece 19 has an integral one-way cleat portion 22A incorporating a metal cleat insert 22B, as seen particularly in FIG. 1.

To secure the tire mat 13 to the vehicle wheel 10, attachment apparatus is provided comprising a first looped member 23 formed of cord, wire or the like, and passing through the rings 16 to the rear of the wheel 10, that is the side of the wheel which is innermost when the wheel is fitted to the vehicle, as shown in FIG. 2. One end of the looped member 23 carries a hook member 24. This may be replaced by a ring if required, but the hook member 24 is more convenient in that it enables the other end of the looped member 23 to be readily engaged thereby. The other end of the looped member 23 passes through the integral sleeve portion 22 of the bridge piece 19, and over the top of the tire in the channel 20 between the two ribs 21 on the bridge piece 19. By pulling on this end of the looped member 23, the lugs 15 on the mat 13 on the rear of the wheel are drawn together and towards the centre of the wheel.

The attachment apparatus further comprises a second looped member 27 formed of cord, wire or the like, and passing through the rings 16 on the front of the wheel 10, that is the side of the wheel which is outermost when the wheel is fitted to the vehicle, as shown in FIG. 1. One end of the looped member 27 is secured to one of the rings 16 at a position 28 adjacent to the position at which the joining flap 17 is fitted. The other end of the looped member 27 is secured to the one end by a hook member 29, and is attached to one end of a strap 31 of a tightening device 26, the strap 31 passing intermediate its ends through a hook member 32 which is connected by a ring to the looped member 27 at a location substantially diametrically opposite to the position 28. Additional links 40 of the same material as the looped members 27 also extend between the rings 16 of pairs of adjacent rings at three positions spaced around the periphery of the wheel.

The end of the first looped member 23 which extends over the top of the tire within the channel 20 between the two ribs 21 on the bridge piece 19 passes through the one-way cleat portion 22A and engages with a snap link 25 of the tightening device 26. The one-way cleat portion 22A prevents the tension in the looped member 23 from slackening when the looped member 23 has been tightened.

The tightening device 26 includes a ratchet mechanism having an operating handle 33 which can be moved backwards and forwards to operate an internal ratchet whereby the strap 31 can be shortened or lengthened by winding it around a roller. Adjustment can therefore take place between the snap link 25 connected to one end of the first looped member 23 and the connection between the strap 31 and the second looped member 27. By this means, tension can be built up in both looped members 23 and 27 at opposite sides of the wheel.

An additional tensioning device in the form of a strap 34 and an adjustable buckle 35 extends transversely with respect to the tightening device 26, and is adjustable in length by means of the buckle 35. At one end of the strap 34 there is a hook member 36 which engages the looped member 27 at an appropriate position between two of the rings 16, and at the other end the strap 34 is connected to the looped member 27 at a position 37 substantially diametrically opposite to the position at which the hooked member 36 is connected to the looped member 27.

The procedure for fitting the mat 13 to a tired wheel is as follows. The mat 13 is laid out flat in front of, or behind, the wheel on the vehicle to which it is to be fitted. The vehicle is then driven in an appropriate direction so that the wheel mounts the mat and reaches approximately the centre of the mat. However, it is not important that the wheel should exactly reach the centre, and indeed it may be more convenient for it to be nearer one end or the other of the mat in order to allow easy access to the ends of the mat. The ends of the mat are then brought together around the tire and joined by means of the joining flap 17.

The first looped member 23 is fitted to the back of the wheel, its end being passed through the hook member 24 and pulled to tighten the loop, although there is no necessity at this stage to apply any substantial force for this purpose. The end of the looped member 23 is then passed through the sleeve portion 22 of the bridge piece 19, along the channel 20 between the two ribs 21 on the bridge piece 19, and through the one-way cleat portion 22A. The end is then engaged with the snap link 25 of the tightening device 26.

Next the second looped member 27, with the strap 31 and the tightening device 26 attached thereto, is fitted to the front of the wheel, its loose end being engaged with the hook member 29 and with the end of the strap 31 of the tightening device. The strap 31 is then engaged with the hook member 32. Before any attempt is made to tighten by means of the tightening device 26, the further strap 34 is secured by the hook member 36 to the looped member 27. If any adjustment of the further strap 34 is needed, this is carried out so that some tension is applied to the second looped member 27, as seen particularly in FIG. 1.

Finally the ratchet mechanism of the tightening device 26 is operated to apply tension to both the first and second looped members 23 and 27.

Tire mats can be fitted to the front and/or rear wheels of a vehicle as appropriate. They are usually fitted in pairs to the driven wheels of a vehicle.

The size of the mat used is obviously dependent upon the circumference of the tire to which it is to be fitted, but the provision for adjustment allows a mat of one size to be fitted to wheels of differing sizes. For larger sizes of wheels, larger sizes of tire mat are used, or two tire mats may be connected together in the manner described, at a position opposite to the joining flap 17.

I claim:

1. Traction apparatus for attachment to a tired wheel, the apparatus comprising a mat spaced around the periphery of the front side of the wheel when the mat is attached to the wheel, a front flexible elongate member for slidingly extending through attachment fittings on a mat, a rear flexible elongate member for slidingly extending through attachment fittings on the mat spaced around the periphery of the rear side of the wheel when the mat is attached to the wheel, respective front and rear sliding attachment means on each of the elongate members for attaching parts of the associated elongate member together so as to enable relative sliding movement between said parts and so as to cause said elongate member to form a respective front and rear intermediate loop portion which extends through the attachment fittings on the associated side of the wheel and a respective front and rear further portion outside said loop portion, guide means for guiding the further portion of the rear elongate member across the circumference of the wheel to the front side of the wheel, and tensioning means for connection at the front side of the wheel to the further portions of both elongate members and operable to tension the loop portions of both elongate members so as to draw the attachment fittings radially inwardly of the wheel and to thereby secure the mat firmly on the wheel.

2. Attachment apparatus according to claim 1, wherein the tensioning means acts between the further portion of the front elongate member and the further portion of the rear elongate member.

3. Attachment apparatus according to claim 1, wherein the tensioning means is also slidingly attached to a further part of the front elongate member which is within the looped portion of said elongate member and which is substantially diametrically opposite the parts of said elongate member which are connected together by the associated sliding attachment means when the mat is attached to the wheel.

4. Attachment apparatus according to claim 1, wherein the tensioning means comprises a strap and a ratchet mechanism operable by a handle to shorten the length of the strap which extends away from the ratchet mechanism.

5. Attachment apparatus according to claim 1, wherein a further tensioning means extends transversely with respect to the first-mentioned tensioning means and is slidingly attached to the looped portion of the front elongate member at two diametrically opposite locations.

6. Attachment apparatus according to claim 5, wherein the further tensioning means comprises a further strap and an adjustable buckle.

7. Attachment apparatus according to claim 1, wherein the guide means comprises a bridge piece for extending across a portion of the mat overlying the circumference of the wheel, said bridge piece incorporating a channel for the further portion of the rear elongate member for preventing said further portion from directly contacting a surface on which the wheel is running.

8. Attachment apparatus according to claim 7, wherein the bridge piece incorporates two upstanding ribs between which the channel is defined and which extend radially outwardly when the mat is attached to the wheel.

9. Attachment apparatus according to claim 7, wherein the bridge piece incorporates a one-way cleat portion through which the further portion of the rear elongate member extends after passing through the channel.

10. Attachment apparatus according to claim 7, wherein the bridge piece incorporates a sleeve portion through which the further portion of the rear elongate member extends before passing through the channel.

* * * * *